United States Patent Office 2,898,156
Patented Aug. 4, 1959

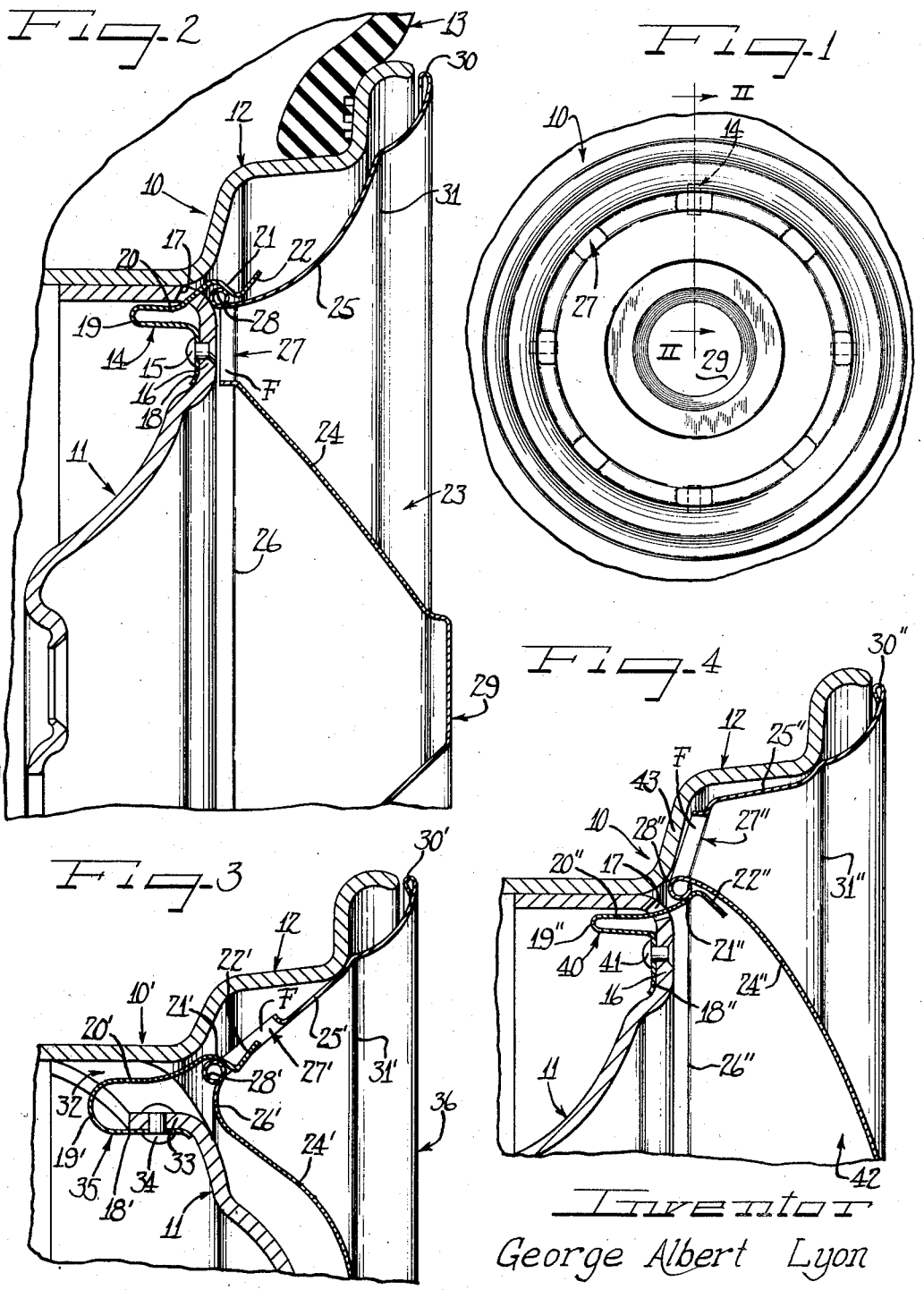

2,898,156
WHEEL COVER
George Albert Lyon, Detroit, Mich.
Application January 3, 1956, Serial No. 556,864
13 Claims. (Cl. 301—37)

This invention relates generally to a new and improved wheel structure including a highly ornamental and utilitarian cover for ornamental and protective disposition on the wheel.

More particularly, this invention relates to a new and improved wheel structure and the interaction between its component parts including a wheel, clips on the wheel, and a particular cover construction.

In the automobile industry there is presently a demand for deeply drawn covers and one aspect of the present invention concerns itself with the manner by which a dished cover may be mounted in close adjacency to the wheel. According to practices presently used a sheet metal blank of a given size is formed into a cover. When the cover is of a deeply drawn type it has been found more difficult to provide integral retaining fingers or the like on the cover due to the shortage of cover material.

One feature of the present invention concerns itself with a particular way in which clips are secured on the under side of the wheel body part and extend axially outwardly through openings adjacent the connection of the rim and body parts, thereby allowing a dished portion of the cover to lie in very close adjacency to the wheel.

Accordingly, an object of this invention is to provide a new and improved interaction between a wheel, retaining clips, and a deeply drawn cover.

Still another object of this invention is to provide a new and improved means for cooling the cover when the cover is mounted upon the wheel.

A further object of this invention is to provide circumferentially spaced struck out openings on the cover generally adjacent wheel openings, the material struck out from the cover openings being utilized as beads or shoulders adapted for retaining cooperation with retaining clips.

A still further object of this invention is to provide a new and improved wheel structure which lends itself to large scale production on an economical basis.

According to the general features of this invention there is provided in a wheel structure including rim and body members with one of the members having a plurality of circumferentially spaced retaining clips secured on the axially inner side thereof and each having cover retaining portions extending generally axially outwardly through wheel openings in the wheel, a dished deeply drawn cover closely overlying the junction of said members including converging annular cover portions defining together an axially inwardly disposed annular groove terminal generally opposite said clips, and having circumferentially spaced ports in communication with said wheel openings to direct air when the wheel is rotated through the cover to cool the wheel, and circumferentially spaced shoulders struck out generally at said openings disposed generally in a common circle and cooperable in snap-on, pry-off cooperation with the clip retaining portions to retain the cover on the wheel.

Other objects and features of the present invention will more fully become apparent from the following detailed description taken in connection with the accompanying drawing illustrating several embodiments thereof in which:

Figure 1 is a side elevation of my novel wheel structure embodying features of the present invention;

Figure 2 is an enlarged fragmentary cross sectional view taken substantially on the line II—II of Figure 1 looking in the direction indicated by the arrows;

Figure 3 is a view similar to Figure 2 only showing a modified form of my invention; and Figure 4 is a view similar to Figure 2 showing still another modified form of my invention.

As shown on the drawing:

The reference numeral 10 indicates generally a more or less conventional automobile vehicle wheel having a body member 11, a multi-flange drop center type tire rim 12, and carrying on the body part and tire rim 11 and 12 a conventional tire assembly 13 which may be either of the tube or tubeless types. It will be appreciated that the tire assembly 13 may be operated and inflated in a customary manner by a valve stem (not shown).

In the first form of my invention, shown in Figures 1 and 2, a series of circumferentially generally U-shaped spaced clips 14 of any suitable number are riveted at 15 to a radial flange portion of body part 11. Disposed generally at the junction of rim and body parts 11 and 12 are a series of circumferentially spaced wheel openings 17 of any suitable number through which air may be circulated and through which the retaining clip 14 extends axially therethrough.

The clip 14 includes an attachment flange 18, a looped or U-shaped cushioning and back-up portion 19, having an axial leg 20 extending through opening 17 axially outwardly of body part 11. Leg 20 extends generally axially outwardly and then generally radially axially and outwardly. At the outer terminal end of leg 20 is provided a radially inwardly facing shoulder 21 which extends generally axially outwardly radially inwardly. Shoulder 21 terminates in a generally radially and axially outwardly extending lead-in portion 22.

It will be appreciated that the clips 14 are made of a resilient material and are adapted to flex in such a manner as to maintain a wheel cover 23 thereon.

The wheel cover 23 in the illustrated form shown in Figure 2 includes converging cover portions 24 and 25 merging into an annular groove 26. Provided in the groove at circumferentially spaced intervals are a series of struck out cover openings 27. It will be noted that as the openings 27 are struck out so that the cover material struck out therefrom is formed into integral flange-like extensions F including a curled reinforcing bead 28. This bead 28 in Figure 2 is positioned on the radially outer side of the opening 27 and does not extend entirely about the circumference of the opening 27.

The cover 23 may be made of any suitable material such as steel or aluminum or the like, preferably of a type that lends itself to being highly lustrous in appearance.

It will be noted that the cover portion 24 emanates from a central dished margin 29 and that the cover portion 25 extends generally radially outwardly terminating in a curled pry-off bead 30. Intermediately disposed on flange 25 is an annular rib 31 for reinforcing same. The instant cover construction lends itself to completely concealing the body and rim parts 11 and 12 respectively and also any balancing weights (not shown) which may be carried on the outer side of the wheel.

In the application of the cover 23 to the wheel, the cover may be initially centered with respect to a valve stem (not shown) and it is in this manner that beads 28 may be axially aligned with respect to clips 14.

The beads 28 are then engaged against lead-in clip portion 22. Upon the application of a further force, the clips are flexed generally radially outwardly until the beads 28 snap behind and into retained engagement with shoulders 21 bottomed against radial body flange 16 in cushioned retained engagement on the wheel.

Removal of the cover may be readily brought about by inserting a suitable pry-off tool underneath the outer bead 30 and upon progressively working same underneath rib 31 the beads 28 may be disengaged from their respective and associated clips 14.

It will now be perceived how a new and highly ornamental deeply dished drawn cover may be assembled on a wheel closely adjacent to the body part 11.

In Figure 3 is shown a modified form of my invention and where like elements are employed like numerals have again been used. Where similar elements have been employed, primed numerals have been employed.

In this instance wheel 10' has a series of circumferentially spaced openings 32 generally at the junction of body and rim parts 11 and 12. The body part 11 has a generally axially extending flange 33 which is connected at intervals to the tire rim 12 in a customary manner and is spaced at other intervals where openings 32 are provided.

Riveted at 34 to axial body flange 33 are a series of circumferentially spaced resilient retaining clips 35 having an attachment portion 18', a looped or U-shaped cushioning and back-up portion 19' including a generally axially extending leg 20' which extends axially outward of body part 11 through an adjacent opening 32. In this form of my invention the clip is again of a U-shaped configuration, however, the attachment portion 18' and leg 20 are spaced further axially apart than in the first form of my invention. Also in Figure 3, positioned between attachment portion 18' and leg 20' enveloped thereby is axial body flange 33.

Overlying the wheel 10' is my modified cover construction 36 which is very similar to cover 23, the cover portions 24' and 25' being configurated in a slightly different manner.

In this instance, the cover portions 24' and 25' converge providing an annular groove 26' generally opposite wheel openings 32. A series of circumferentially spaced openings 27' are struck out of cover portion 25'. Provided on the radially inner side of each of the openings 27' is an integral flange-like extension F formed into a curled under retaining bead 28' on the radially inner side of opening 27'.

In this instance, the cover is assembled on the wheel by centering and extending the valve stem (not shown) through the cover thereby centering the beads 28' with respect to clips 35. At this point, bead 28' is adapted to engage against lead-in flange 22'. Upon the application of a slight axial inward force, the bead 28' snaps behind in resilient retained engagement with radially inwardly facing shoulder 21'.

In so doing, the lead-in portion 22' extends out through opening 27' and is visible from the outer side of the wheel 10'. When the cover is in full assembly upon the wheel rib 31' is bottomed against the junction of flanges of the tire rim 12 in bottom engagement therewith.

The cover 36 may be disengaged from wheel 10' by applying axially inward pressure to the clip portion 22' to release the tension between the clips 35 and the bead 28'.

In Figure 4 is shown still another form of my invention and here again where the same elements appear the same numerals have been again used, and where altered though similar elements have been employed, primed numerals have been utilized.

The wheel construction 10 in this form of my invention is much the same as in the first form of my invention. Here again, circumferentially spaced retaining clips 40 are riveted at 41 to radial body flange 16.

The clips 40 include an attachment portion 18", a looped or U-shaped cushioning and back-up portion 19" including an axial leg 20" each extending out through aligned wheel opening 17.

In this instance, the leg 20" is progressively inclined generally axially and radially outwardly providing generally on the axially outer end thereof a generally radially outwardly facing shoulder 21"; shoulder 21" terminating in a lead-in terminal 22".

Cooperable with the wheel 10 shown in Figure 4 is shown a still further cover construction designated by the numeral 42.

Cover 42 includes converging cover portions 24" and 25", cover portion 24" extending generally axially inwardly radially outwardly with cover portion 25" extending generally radially and axially inwardly. The cover portions 24" and 25" merge in an annular groove 26" which is disposed generally opposite rim flange 43. A series of openings 27" are provided at circumferentially spaced intervals in annular groove 26". These openings 27" are struck out with the material struck out being formed in a continuous flange F. Disposed on the radially inner side of openings 27' and integral with flange F are curled retaining beads 28".

In this form of my invention, the cover is again adapted to be centered by means of centering the valve stem (not shown) with respect to the corresponding opening (not shown) in the cover and thereafter engaging beads 28" against lead-in clip portions 22" and upon the application of an axially inward force, the bead 28" is adapted to ride over into retaining engagement with shoulder 21". It will be readily noted that in this instance the shoulder 21" is flexed generally radially inwardly when the cover 42 is mounted upon the wheel.

Removal of the cover may be effected in much the same manner as in the other forms of my invention such as by inserting a suitable pry-off tool underneath the bead 28" and pulling the cover away from the clips. In addition, it will be noted that rib 31" is bottomed against the junction of flanges on the tire rim 12.

In all forms of my invention it will be noted that the openings 27, 27' and 27" are in each case generally centered with respect to wheel openings 17, 17 and 32 respectively. By so doing, at least some circulation may be promoted with air movable through the wheel and the channel formed by the converging cover portions or grooves 26, 26' and 26" to cool the brake drum (not shown).

Also commonly found in all three forms of my invention are struck out openings 27, 27' and 27". In each case the material struck out is formed into a reinforcing flange F with the flange F further formed at predetermined intervals into a cushioning retaining bead 28, 28' and 28", as the case may be.

Still another common feature of this invention resides in the clip construction, in that in each case the clip is generally U-shaped and has on its outer end a shoulder 21, 21' and 21" terminating in a lead-in portion 22, 22' and 22".

In all forms of my invention the cover is adapted to snugly nest in close adjacency with the dished portion of the wheel in order to give a highly ornamental appearance.

It will be understood that modifications and variations may be effected without departing from the scope of the novel concepts of the present invention.

I claim as my invention:

1. In a wheel structure including rim and body members with one of the members having a plurality of circumferentially spaced retaining clips secured on the axially inner side thereof and each having cover retaining portions extending generally axially outwardly through wheel openings in the wheel, a dished deeply drawn cover closely overlying the junction of said members including converging annular cover portions defining together an axially inwardly disposed annular groove terminal generally opposite said clips, and having circumferentially spaced ports in communication with said wheel openings to direct air when the wheel is rotated through the cover to cool the wheel, and circumferentially spaced shoulders struck out generally at said openings disposed generally in a common circle and cooperable in snap-on, pry-off cooperation with said clip retaining portions to retain the cover on the wheel.

2. In a wheel structure including rim and body members with one of the members having a plurality of retaining clips secured on one of said members and each having cover retaining portions extending generally axially outwardly through registered openings in the wheel, a dished cover including converging annular cover portions defining together an annular groove generally opposite said clips and having circumferentially spaced ports in communication with said openings to direct air when the wheel is rotated through the cover to cool the wheel, and shoulder means on said cover generally at said openings disposed generally in a common circle and cooperable in snap-on, pry-off cooperation with said cover retaining portions to retain the cover on the wheel.

3. In a wheel structure including rim and body members with one of the members having a plurality of retaining clip means secured on one of said members and each having cover retaining portions extending generally axially outwardly through registered openings in the wheel, a dished cover including converging annular cover portions defining together an annular groove generally opposite said clip means and having circumferentially spaced ports in communication with said openings to direct air when the wheel is rotated through the cover to cool the wheel, and shoulder means on said cover generally at said openings disposed generally in a common circle and cooperable in snap-on, pry-off cooperation with said cover retaining portions to retain the cover on the wheel, said shoulder means comprising circumferentially spaced heads.

4. In a wheel structure including rim and body members with one of the members having a plurality of retaining clip means secured on one of said members and each having cover retaining portions extending generally axially outwardly through registered openings in the wheel, a dished cover including converging annular cover portions defining together an annular groove generally opposite said clip means and having circumferentially spaced ports in communication with said openings to direct air when the wheel is rotated through the cover to cool the wheel, and shoulder means on said cover generally at said openings disposed generally in a common circle and cooperable in snap-on, pry-off cooperation with said cover retaining portions to retain the cover on the wheel, said openings being struck out from said cover with struck out cover material utilized as said shoulder means.

5. In a wheel structure including rim and body members with one of the members having a plurality of retaining clip means secured on one of said members and each having cover retaining portions extending generally axially outwardly through registered openings in the wheel, a dished cover including converging annular cover portions defining together an annular groove generally opposite said clip means and having circumferentially spaced ports in communication with said openings to direct air when the wheel is rotated through the cover to cool the wheel, and shoulder means on said cover generally at said openings disposed generally in a common circle and cooperable in snap-on, pry-off cooperation with said cover retaining portions to retain the cover on the wheel, said openings being struck out from said cover with struck out cover material utilized as said shoulder means, said shoulder means comprising integral extensions with one of said cover portions.

6. In a wheel structure including connected rim and body parts with a plurality of circumferentially spaced wheel openings generally at the connection of said parts and a plurality of circumferentially spaced retaining clips secured to the axially inner side of one of said parts each including an attachment portion secured to one of said parts, said clips each having a back-up cushioning portion, the back-up cushioning portion having a leg portion extending out through one of said wheel openings, each of said clips having a shouldered portion and a lead-in terminal connected to said leg portion, a deeply dished cover having circumferentially spaced ports generally opposite the connection of said parts to facilitate circulation of air into said wheel openings to cool the wheel and shoulder means disposed generaly in a common circle at said ports comprised of edge portions of said ports and cooperable with said shouldered portions to retain the cover on the wheel.

7. In a wheel structure including connected rim and body parts with a plurality of circumferentially spaced wheel openings generally at the connection of said parts and a plurality of circumferentially spaced retaining clips secured to the axially inner side of one of said parts each including an attachment portion secured to one of said parts, a back-up cushioning portion having a leg portion extending out through one of said wheel openings, a shouldered portion and a lead-in terminal, a deeply dished cover having circumferentially spaced ports generally opposite the connection of said parts to facilitate circulation of air into said wheel openings to cool the wheel and shoulder means disposed generally in a common circle at said ports cooperable with said shouldered portions to retain the cover on the wheel, said cover including inner and outer converged cover portions with the outer cover portion having a turned under beaded extension disposed on the radially outer side of said opening comprising said shoulder means, said clips being flexible radially outwardly in retaining engagement with said extensions.

8. In a wheel structure including connected rim and body parts with a plurality of circumferentially spaced wheel openings generally at the connection of said parts and a plurality of circumferentially spaced retaining clips secured to the axially inner side of one of said parts each including an attachment portion secured to one of said parts, a back-up cushioning portion having a leg portion extending out through one of said wheel openings, a shouldered portion and a lead-in terminal, a deeply dished cover having circumferentially spaced ports generally opposite the connection of said parts to facilitate circulation of air into said wheel openings to cool the wheel and shoulder means disposed generally in a common circle at said ports cooperable with said shouldered portions to retain the cover on the wheel, said cover including inner and outer converged cover portions with the outer cover portion having a turned under beaded extension disposed on the radially outer side of said opening comprising said shoulder means, said clips being flexible radially outwardly in retaining engagement with said extensions, said beaded extensions being bottomed against one of said parts in bottomed backed-up engagement with the wheel.

9. In a wheel structure including connected rim and body parts with a plurality of circumferentially spaced wheel openings generally at the connection of said parts and a plurality of circumferentially spaced retaining clips secured to the axially inner side of one of said parts each including an attachment portion secured to one of said parts, a back-up cushioning portion having a leg portion extending out through one of said wheel openings, a shouldered portion and a lead-in terminal, a deeply dished cover having circumferentially spaced ports generally opposite the connection of said parts to facilitate circulation of air into said wheel openings to cool the wheel and shoulder means disposed generally in a common circle at said ports cooperable with said shouldered portions to retain the cover on the wheel, said cover including inner and outer converging cover portions with the outer cover portion having a beaded extension disposed on the radially inner side of said opening comprising said shoulder means, said clips being flexible radially outwardly and extending into the adjoining port in retaining engagement with said extensions.

10. In a wheel structure including connected rim and body parts with a plurality of circumferentially spaced wheel openings generally at the connection of said parts and a plurality of circumferentially spaced retaining clips secured to the axially inner side of one of said parts each including an attachment portion secured to one of said parts, a back-up cushioning portion having a leg portion extending out through one of said wheel openings, a shouldered portion and a lead-in terminal, a deeply dished cover having circumferentially spaced ports generally opposite the connection of said parts to facilitate circulation of air into said wheel openings to cool the wheel and shoulder means disposed generally in a common circle at said ports cooperable with said shouldered portions to retain the cover on the wheel, said cover including inner and outer converged cover portions with the inner cover portion having a turned under beaded extension disposed on the radially inner side of said opening comprising said shoulder means, said clips being flexible radially inwardly in retaining engagement with said extensions.

11. In a wheel structure, a wheel including rim and body members with the wheel having a plurality of resiliently deflectable retaining clips carried thereon at the area of the junction of the rim and body members, a wheel cover member for overlying dispostion upon the wheel and having a dished area disposed generally at the locale of the junction of the rim and body members with the dished area having circumferentially spaced cover openings therein with at least some of the openings having edge portions providing shoulder means with said clips in detachable cover retaining assembly therewith.

12. In a wheel structure including rim and body members with one of the members having a plurality of retaining clip means secured on one of said members and each having cover retaining portions extending generally axially outwardly through registered openings in the wheel, a dished cover including converging annular cover portions defining together an annular groove generally opposite said clip means and having circumferentially spaced ports in communication with said openings, and shoulder means generally at said openings disposed generally in a common circle and cooperable in snap-on, pry-off cooperation with said cover retaining portions to retain the cover on the wheel.

13. In a wheel structure, a wheel including connected rim and body parts with a plurality of circumferentially spaced wheel openings generally at the connection of said parts and a plurality of circumferentially spaced retaining clips secured to the axially inner side of one of said parts, said clips each having a back-up cushioning portion, the back-up cushioning portion having a leg portion extending out through one of said wheel openings, each of said clips having a shouldered portion and a lead-in terminal connected to said leg portion, a deeply dished cover having circumferentially spaced ports generally opposite the connection of said parts and shoulder means disposed generally in a common circle at said ports comprised of edge portions of said ports and cooperable with said shouldered portions to retain the cover on the wheel.

References Cited in the file of this patent

UNITED STATES PATENTS

| | | |
|---|---|---|
| 2,239,367 | Lyon | Apr. 22, 1941 |
| 2,624,626 | Lyon | Jan. 6, 1953 |
| 2,683,629 | Lyon | July 13, 1954 |

FOREIGN PATENTS

| | | |
|---|---|---|
| 507,892 | Canada | Dec. 7, 1954 |